(12) United States Patent
Jordan et al.

(10) Patent No.: US 12,578,758 B2
(45) Date of Patent: *Mar. 17, 2026

(54) INTERACTIVE DEVICE OF AN ATTRACTION SYSTEM

(71) Applicant: Universal City Studios LLC, Universal City, CA (US)

(72) Inventors: Robert Michael Jordan, Orlando, FL (US); Patrick John Goergen, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,624

(22) Filed: Apr. 8, 2024

(65) Prior Publication Data

US 2024/0255992 A1 Aug. 1, 2024

Related U.S. Application Data

(63) Continuation of application No. 17/509,586, filed on Oct. 25, 2021, now Pat. No. 11,953,941.

(51) Int. Cl.
G06F 1/16 (2006.01)

(52) U.S. Cl.
CPC ............ G06F 1/163 (2013.01); G06F 1/1639 (2013.01)

(58) Field of Classification Search
CPC .............................. G06F 1/163; G06F 1/1639
See application file for complete search history.

(56) References Cited

U.S. PATENT DOCUMENTS

| | | | |
|---|---|---|---|
| 5,844,530 A | 12/1998 | Tosaki | |
| 8,437,491 B2 | 5/2013 | Ward | |
| 9,152,277 B1 * | 10/2015 | Beguin | G06F 3/045 |
| 9,525,765 B2 | 12/2016 | Moser | |
| 10,354,651 B1 | 7/2019 | Yi et al. | |
| 10,802,290 B2 * | 10/2020 | Lin | G02B 27/0176 |
| 10,809,429 B1 * | 10/2020 | Richards | G02B 27/0093 |
| 10,863,637 B1 * | 12/2020 | Pickett | H05K 5/0204 |
| 10,874,163 B2 | 12/2020 | VanDerWoude et al. | |
| 11,327,307 B2 * | 5/2022 | Georgiou | G02B 17/0856 |
| 11,328,692 B2 * | 5/2022 | Cartier | H04R 1/028 |
| 11,353,952 B2 * | 6/2022 | Tornéus | G06F 3/013 |
| 11,526,014 B2 | 12/2022 | Sheng | |
| 11,538,227 B2 | 12/2022 | Konings et al. | |
| 11,605,396 B2 | 3/2023 | Brown | |

(Continued)

FOREIGN PATENT DOCUMENTS

| | | |
|---|---|---|
| CN | 104423040 A | 3/2015 |
| CN | 204561084 U | 8/2015 |

OTHER PUBLICATIONS

PCT/US2022/046913 International Search Report and Written Opinion mailed Feb. 15, 2023.

(Continued)

*Primary Examiner* — Rockshana D Chowdhury
(74) *Attorney, Agent, or Firm* — Fletcher Yoder, P.C.

(57) ABSTRACT

A wearable device for an attraction system includes a display, a projector oriented at a first oblique angle with respect to the display and configured to project an image onto the display, and a microphone oriented at a second oblique angle with respect to the display. The microphone is configured to receive audio waves deflecting off the display.

20 Claims, 5 Drawing Sheets

(56)                References Cited

U.S. PATENT DOCUMENTS

| | | | | | |
|---|---|---|---|---|---|
| 11,782,480 | B1 * | 10/2023 | Hatfield | ................. | G06F 1/163 |
| | | | | | 224/576 |
| 11,990,129 | B2 * | 5/2024 | Legerton | ................ | G06F 3/165 |
| 12,061,339 | B1 * | 8/2024 | Zimmerman | ........... | G06F 1/163 |
| 2008/0302599 | A1 | 12/2008 | Zou | | |
| 2015/0067516 | A1 * | 3/2015 | Park | ...................... | G06F 3/0304 |
| | | | | | 715/728 |
| 2015/0332075 | A1 * | 11/2015 | Burch | ................ | G06F 3/04886 |
| | | | | | 370/336 |
| 2016/0171772 | A1 * | 6/2016 | Ryznar | ................ | G02B 27/017 |
| | | | | | 345/633 |
| 2017/0243520 | A1 * | 8/2017 | Teshima | ................. | G10L 15/26 |
| 2018/0101986 | A1 * | 4/2018 | Burns | .................. | G06T 19/006 |
| 2019/0258061 | A1 * | 8/2019 | Solomon | ........... | G02B 27/0172 |
| 2020/0368625 | A1 | 11/2020 | Iwata et al. | | |
| 2021/0080763 | A1 * | 3/2021 | Sulai | ........................ | G02B 3/08 |
| 2021/0185855 | A1 * | 6/2021 | Maric | ..................... | G06F 3/011 |
| 2021/0294107 | A1 * | 9/2021 | Hu | ..................... | G02B 27/0172 |
| 2022/0100462 | A1 * | 3/2022 | Karri | ....................... | G06F 1/163 |
| 2022/0146835 | A1 | 5/2022 | Hu | | |
| 2022/0287180 | A1 | 9/2022 | Yang et al. | | |
| 2022/0350559 | A1 * | 11/2022 | Yoon | ..................... | G06F 3/1423 |
| 2024/0045101 | A1 * | 2/2024 | Guest | ................ | G02B 27/0093 |
| 2024/0103617 | A1 * | 3/2024 | Yerkes | ................... | G06F 3/017 |

OTHER PUBLICATIONS

Screen captures from YouTube video clip entitled "F-35 Pilot Wears $400,000 Super Advanced Helmet for the First Time," 3 pages, uploaded on Aug. 12, 2021, by user "HBB Defense Military". Retrieved from Internet: <https://youtu.be/GCNCnXg8HIU?si=H6rCLTKj83bFFUTH>.

* cited by examiner

INTERACTIVE DEVICE OF AN ATTRACTION SYSTEM

CROSS-REFERENCE TO RELATED APPLICATION

This application is a continuation of U.S. patent application Ser. No. 17/509,586, entitled "INTERACTIVE DEVICE OF AN ATTRACTION SYSTEM," filed Oct. 25, 2021, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Throughout amusement parks and other entertainment venues, special effects can be used to help immerse guests in the experience of a ride or attraction. Immersive environments may include three-dimensional (3D) props and set pieces, robotic or mechanical elements, and/or display surfaces that present media. For example, the immersive environment may be provided via components that are operated based on actions performed by the guests. As such, the attraction may provide an interactive experience for the guests. However, identification or detection of the actions performed by the guests, and therefore determination of an appropriate operation of a corresponding component, may be complex or difficult. Thus, improvements for attractions are desired to provide a more suitable or desirable interactive experience.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a wearable device for an attraction system includes a display, a projector oriented at a first oblique angle with respect to the display and configured to project an image onto the display, and a microphone oriented at a second oblique angle with respect to the display. The microphone is configured to receive audio waves deflecting off the display.

In an embodiment, a wearable device for an attraction system includes a wearable component and an interactive assembly configured to couple to the wearable component. The interactive assembly includes a projector configured to project an image, a microphone, and a display. The projector is oriented at a first oblique angle with respect to the display such that that the image projected by the projector is presented on the display, and the microphone is oriented at a second oblique angle with respect to the display such that the microphone is focused to receive audio waves deflecting off the display.

In an embodiment, an attraction system includes an interactive device having a display, a projector, and a microphone. The projector and the microphone are angled obliquely with respect to the display such that the projector is configured to project an image onto the display and the microphone is configured to receive audio waves deflecting off the display. The attraction system also includes a controller communicatively coupled to the microphone and the projector of the interactive device. The controller is configured to receive audio data via the microphone and transmit image data to the projector based on the audio data to cause the projector to project the image.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
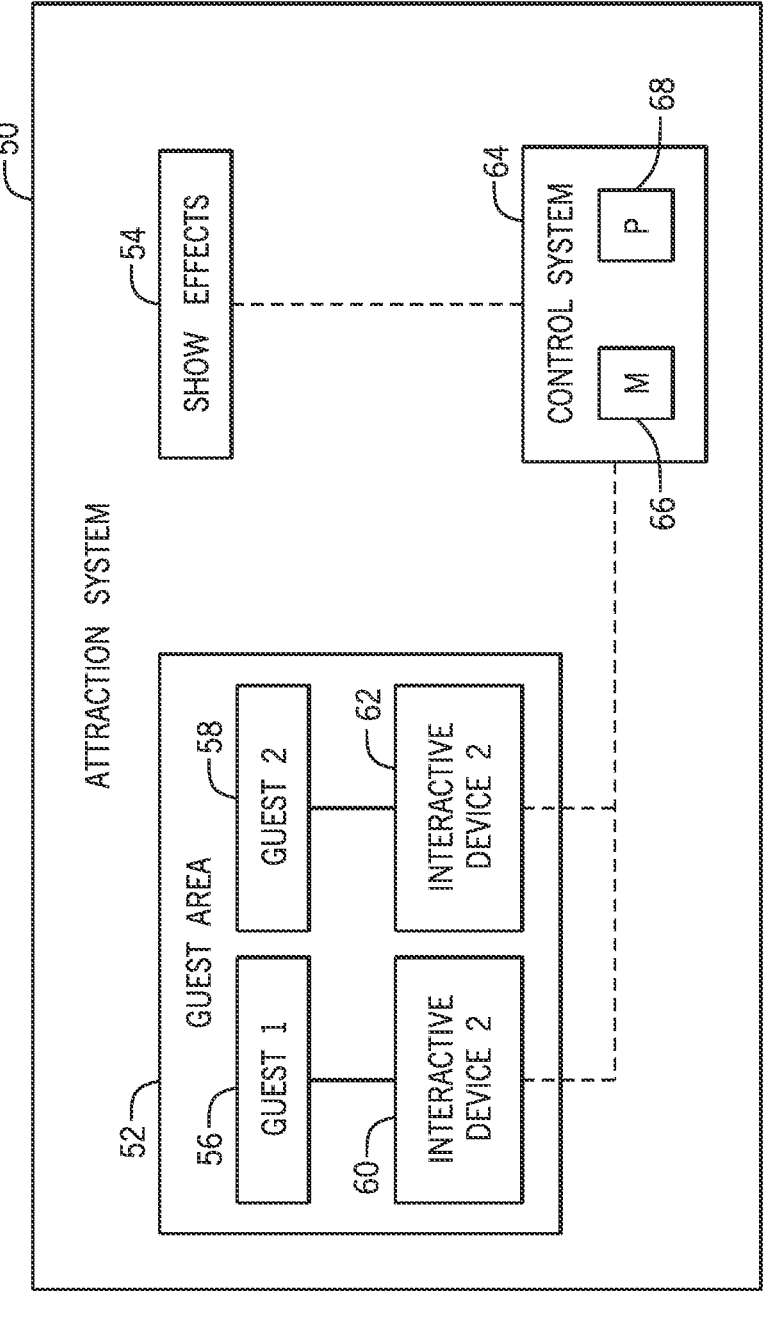
FIG. 1 is a schematic diagram of an embodiment of an attraction system, in accordance with an aspect of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to an interactive attraction system, such as for an amusement or theme park. The attraction system may be operated based on actions performed by guests of the attraction system. For example, a particular element or feedback (e.g., an audio effect, a visual image) may be presented based on audio input (e.g., speech) provided by one of the guests. Indeed, different elements may be presented to different guests based on the specific audio input provided by the guests. As such, the attraction system may provide a unique and interactive experience to each of the guests. The attraction system may refer to or include interactive devices that are each operable to both receive input (e.g., audio input via a microphone) and provide output (e.g., visual output via a display).

In an embodiment, each guest may equip an interactive device, such as a headset, configured to receive the audio input. The attraction system (e.g., a set of interactive devices or an individual interactive device) may be operated (e.g., provide output) based on the audio input received from the interactive device. For example, multiple guests may be participating in an experience, each guest may speak a command into a microphone of a headset (interactive device) being worn by the respective guest, and the headset may respond to the command by outputting specific media (e.g., a sound, an image, a graphic, a video) responsive to the command. As a specific example, a user may speak a command to "paint the wall red," and augmented reality (AR) may be utilized to make a wall appear to turn red, as observed via AR goggles of the headset. However, multiple audio inputs may be received by one of the interactive devices. For instance, an interactive device may receive first audio input received from a first guest (e.g., a guest equipping the interactive device), second audio input from a second guest (e.g., an adjacent guest who is not equipping the interactive device equipped by the first guest), and/or third audio input from a show effect of the attraction system. The different audio inputs may interfere with one another to cause undesirable operation of the attraction system based on unintentionally received audio input. That is, the attraction system may not be operated based on the first input, and/or the attraction system may be undesirably adjusted based on the second audio input and/or the third audio input. As a specific example, a first guest may speak a command that is picked up by the microphone in the headset of a second guest, resulting in the command being implemented for the second guest despite the command not being issued from the second guest.

Thus, it is presently recognized that operating an interactive device to limit undesirable audio inputs and focus on desirable audio inputs may facilitate operation of the attraction system. Accordingly, embodiments of the present disclosure are directed to an interactive device that may block receipt of certain audio input. Specifically, the interactive device may be designed to focus on audio input from a guest that is equipping the interactive device and exclude audio input from other sources (e.g., other guests that are not equipping the interactive device, show effects, environmental features) that may be nearby.

When a guest is equipping an interactive device, the guest may be referred to as associated with the interactive device or as an "associated guest." The interactive device may include a display configured to present visual images to a guest that is equipping the interactive device. The display may include a panel that is arranged (e.g., angled, positioned relative to the face of the associated guest) to enable the associated guest to comfortably view such visual images (e.g., augmented reality, virtual reality, or mixed reality images). As an example, the display may be positioned to form a space between the associated guest and the display. The interactive device may also include a microphone configured to receive audio input provided by the associated guest. The microphone may be positioned in a manner (e.g., angled, positioned relative to the display) to receive audio input provided by the associated guest and deflecting off the display panel. For instance, the microphone may extend in the space formed between the associated guest and the display. Such positioning of the microphone may also enable the display to block certain audio input that is not provided by the associated guest. By way of example, the display and/or another component of the interactive device may block audio input from entering the space between the associated guest and the display and/or block deflection of audio input off the display toward the microphone. Thus, the arrangement of the microphone may block the audio input provided by the associated guest from being interfered with by other audio input. In this way, the interactive device may enable the attraction system to be operated more desirably based on the audio input provided by the associated guest.

With the preceding in mind, FIG. 1 is a schematic diagram of an embodiment of an attraction system 50 of an amusement park. For example, the attraction system 50 may include a roller coaster, a motion simulator, a water ride, a walk through attraction (e.g., a maze), and the like. The attraction system 50 may include a guest area 52 where various guests may be located. In an embodiment, the guest area 52 may include a ride vehicle, which may move (e.g., translate, rotate, pivot) about a motion base and/or along a track of the attraction system 50 and/or remain stationary within the attraction system 50. In an additional or an alternative embodiment, the guest area 52 may include an open space, such as a walkable area (e.g., a queue or line). The attraction system 50 may also include show effects 54, which may be operated to enhance the guest experience provided by the attraction system 50. For instance, the show effects 54 may include lighting, a movable object (e.g., a robot), smoke effects, audio effects, and the like. Although the show effects 54 are located outside of the guest area 52 in the illustrated attraction system 50, the show effects 54 may be at least partially located within the guest area 52 in an additional or an alternative attraction system 50.

In the illustrated embodiment, a first guest 56 and a second guest 58 are located within the guest area 52. Each of the guests 56, 58 may equip (e.g., wear or interface with) a respective interactive or wearable device. As such, the first guest 56 may equip a first interactive device 60 (e.g., a first wearable device), and the second guest 58 may equip a second interactive device 62 (e.g., a second wearable device). As described herein, each of the interactive devices 60, 62, may include a wearable headset configured to be positioned about the respective heads of the corresponding guests 56, 58. However, additional or alternative interactive devices 60, 62 may be wearable or otherwise equipped by the guests 56, 58 in a different manner (e.g., by holding the interactive devices 60, 62).

Each of the interactive devices 60, 62 may be configured to receive input from the respective guests 56, 58 based on the interaction between the guests 56, 58 and the interactive devices 60, 62. Such input may include speech (e.g., spoken words), gestural motions, physical contact, facial expressions, and the like. Such inputs may be captured via sensors (e.g., motion detectors, gyroscopes, accelerometers, microphones, image sensors, cameras) of the interactive devices 60, 62. Additionally, the attraction system 50 (e.g., output of the interactive devices 60, 62, operation of a ride vehicle, operation of show effects) may be operated based on the input received by the interactive devices 60, 62. To this end, the attraction system 50 may include a control system 64

(e.g., an automated or programmable controller). The control system 64 may include a memory 66 and processing circuitry 68. The memory 66 may include volatile memory, such as random access memory (RAM), and/or non-volatile memory, such as read-only memory (ROM), optical drives, hard disc drives, solid-state drives, or any other non-transitory computer-readable medium that includes instructions to operate the attraction system 50. The processing circuitry 68 may be configured to execute such instructions. For example, the processing circuitry 68 may include one or more application specific integrated circuits (ASICs), one or more field programmable gate arrays (FPGAs), one or more general purpose processors, or any combination thereof.

In an embodiment, the control system 64 may be communicatively coupled to each of the interactive devices 60, 62, and the control system 64 may be configured to operate the interactive devices 60, 62. By way of example, the control system 64 may be configured to instruct the interactive devices 60, 62 to present various outputs to entertain the guests 56, 58. For instance, the control system 64 may instruct the interactive devices 60, 62 to display visual images and/or to output audio effects (e.g., sounds) to the guests 56, 58. Additionally or alternatively, the control system 64 may be configured to control the show effects 54. Indeed, the control system 64 may be configured to control operation of the interactive devices 60, 62 and/or the show effects 54 to provide a particular experience to the guests 56, 58, such as to provide virtual elements for an immersive experience.

The control system 64 may also provide an interactive experience to the guests 56, 58 by controlling operation of the interactive devices 60, 62 based on input provided by the guests 56, 58 (e.g., interactions between the guests 56, 58 and the interactive devices 60, 62). That is, the control system 64 may operate the interactive devices 60, 62 (e.g., instruct the interactive devices 60, 62 to display a particular visual image and/or output a particular audio effect) and/or the show effects 54 (e.g., actuate a particular one of the show effects 54) based on the input provided by the guests 56, 58. As an example, the control system 64 may operate the attraction system 50 based on audio input provided by the guests 56, 58, such as by identifying keywords spoken by the guests 56, 58 and operating the attraction system 50 based on the keywords. In this way, each of the guests 56, 58 may experience a more personalized or unique experience based on their particular interaction with the interactive devices 60, 62.

In a further embodiment, the control system 64 may associate each of the guests 56, 58 with a particular user profile and may operate the attraction system 50 based on the user profile to provide the personalized experience to the guests 56, 58. For instance, each user profile may include various types of information, such as user preferences and/or a previous operation of the attraction system 50, used by the control system 64 to operate the attraction system 50. In an example, the control system 64 may associate respective audio input (e.g., audio input having certain characteristics, such as a certain pitch, tone, inflection) with different user profiles. The control system 64 may receive audio input provided by one of the guests 56, 58, identify a user profile associated with the received audio input, and operate the attraction system 50 (e.g., the interactive devices 60, 62) based on the user profile. In another example, the control system 64 may receive other information indicative of the user profile, such as a user input that indicates a selected user profile, to operate the attraction system 50.

Further, the interactive devices 60, 62 may block interference between audio inputs. Indeed, each of the interactive devices 60, 62 may be configured to receive audio input provided by the guest 56, 58 to which the corresponding interactive device 60, 62 is equipped while blocking audio input provided by other sources (e.g., the show effects 54, guests who are not equipping the corresponding interactive device 60, 62). For example, the first interactive device 60 may be configured to receive audio input provided by the first guest 56 while the first interactive device 60 is equipped by the first guest 56, and the second interactive device 62 may be configured to receive audio input provided by the second guest 58 while the second interactive device 62 is equipped by the second guest 58. However, the first interactive device 60 may block audio input provided by the second guest 58 while the first interactive device 60 is equipped by the first guest 56, and the second interactive device 62 may be configured to block audio input provided by the first guest 56 while the second interactive device 62 is equipped by the second guest 58.

The control system 64 may also block undesirable operation of the attraction system 50 based on audio input that is not provided by the guest 56, 58 to which the corresponding interactive device 60, 62 is equipped. In one embodiment, the control system 64 may filter audio input received by the interactive device 60, 62, such as by blocking certain detected audio input (e.g., audio input provided by the show effects 54 and/or a guest who is not equipping the interactive device 60, 62). As an example, the control system 64 may determine that the interactive device 60, 62 is receiving multiple audio inputs and may block the interactive device 60, 62 from processing an audio input of the audio inputs having the weakest signal or intensity (e.g., the quietest sound) to enable the interactive device 60, 62 to process audio input having the strongest signal or intensity (e.g., the loudest sound, which may be provided by the guest 56, 58 to which the interactive device 60, 62 is equipped). As another example, the control system 64 may monitor audio input being received by each of the interactive devices 60, 62, determine that one of the interactive devices 60, 62 is receiving a particular audio input and is to process the particular audio input, and block other interactive devices from processing the particular audio input. For instance, the control system 64 may determine that the first interactive device 60 is to process the audio input provided by the first guest 56 (e.g., based on the received audio input having a strength or intensity above a threshold level) and, in response, may block the second interactive device 62 from processing the audio input provided by the first guest 56 (e.g., by filtering out received audio input that includes characteristics or patterns similar to that of the audio input to be processed by the first interactive device 60). Indeed, the control system 64 may determine a location of the interactive device 60, 62 (e.g., relative to other interactive devices 60, 62) receiving audio input and predict which other interactive device(s) 60, 62 may also receive the same audio input (e.g., based on the distance between the interactive device(s) 60, 62 being below a threshold distance) to block the other interactive(s) 60, 62 from processing the audio input. As a specific example of the foregoing, the first interactive device 60 may detect that the first guest 56 issued a verbal command to "start." The audio input associated with this command (which may be predicted early in detection of the command based on detection of the sound "sta") may then be blocked or filtered by the second interactive device 62 to avoid confusion between commands. By detecting and/or predicting the nature of audio inputs (e.g., identifiable verbal instructions) for processing, more specific filtering or blocking of undesirable audio input can be achieved.

Figure 2:
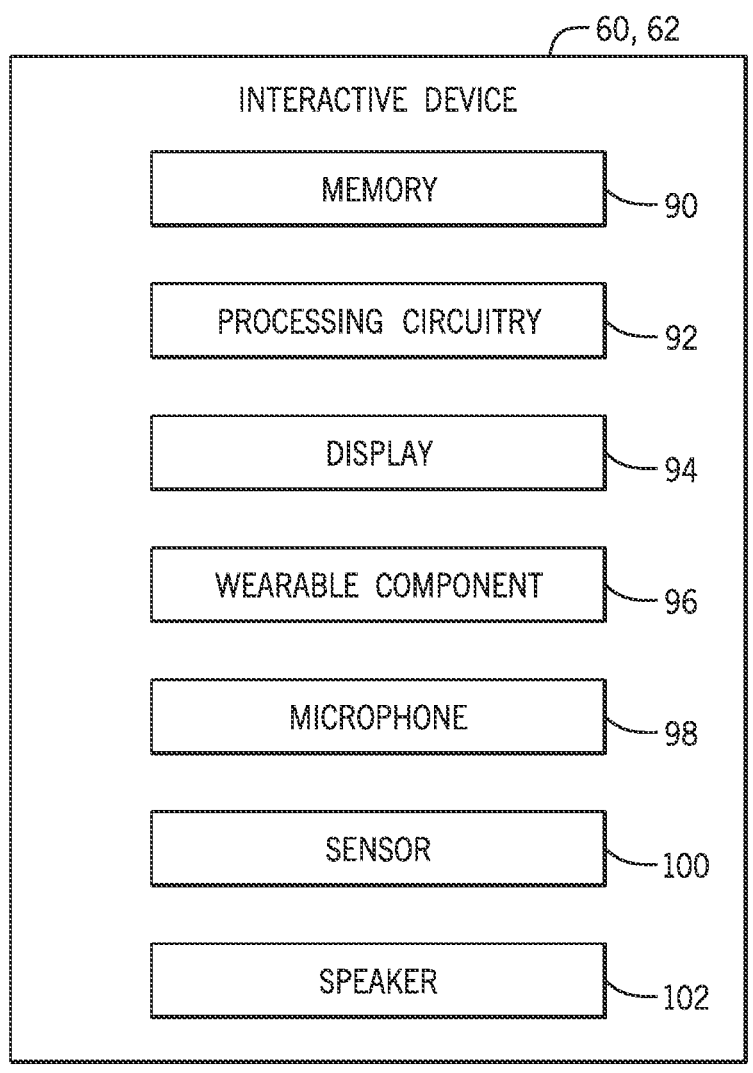
FIG. 2 is a schematic diagram of an embodiment of an interactive device of an attraction system, in accordance with an aspect of the present disclosure.

FIG. 2 is a schematic diagram of an embodiment of one of the interactive devices 60, 62. The interactive device 60, 62 may include a memory 90 and processing circuitry 92. In an embodiment, the memory 90 and the processing circuitry 92 may be separate from the memory 66 and the processing circuitry 68 of the control system 64. In such an embodiment, the processing circuitry 92 of the interactive device 60, 62 may be configured to perform operations separate from the operations performed by the processing circuitry 68 of the control system 64.

The interactive device 60, 62 may also include a display 94, which may be configured to present a visual image (e.g., based on instructions received from the processing circuitry 68 and/or the processing circuitry 92). The interactive device 60, 62 may further include a wearable component 96 to facilitate equipping of the interactive device 60, 62 to the guest 56, 58. By way of example, the wearable component 96 may include a headset, which may have a strap configured to be secured around the head of the guest 56, 58. Indeed, the wearable component 96 may be adjustable to accommodate the size of the body part and for better securement to the guest 56, 58. In an embodiment, the wearable component 96 and the display 94 may be arranged relative to one another (e.g., coupled to one another) in order to position the display 94 in a desirable manner with respect to the guest 56, 58 while the wearable component 96 is equipped. As an example, while the interactive device 60, 62 is equipped by the guest 56, 58 via the wearable component 96, the display 94 may be offset from the eyes of the guest 56, 58 by a particular distance and/or may be oriented relative to the head of the guest 56, 58 at a particular angle that facilitates viewing of the visual image presented by the display 94.

The interactive device 60, 62 may further include a microphone 98, which may be configured to receive audio input (e.g., audio input provided by the guest 56, 58). The microphone 98 may be positioned relative to the display 94 to enable the microphone 98 to receive audio input that deflects off the display 94 (e.g., audio input provided by the guest 56, 58 equipping the interactive device 60, 62). Such arrangement of the microphone 98 may also block receipt of other audio input, such as audio input provided by a guest who does not equip the interactive device 60, 62 and/or audio input provided by the show effects 54. For example, the display 94 may block certain audio input from being directed to the microphone 98 (e.g., from deflecting off the display 94 toward the microphone 98). In an embodiment, the microphone 98 may include a directional microphone (e.g., a unidirectional microphone, a cardioid microphone) configured to receive audio input at a specific location or traveling in a specific direction relative to the microphone 98 (e.g., audio input deflecting off the display 94 and toward the microphone 98 at a particular angle). Thus, the relative positioning of the microphone 98 and the display 94 may further block or filter receipt of certain audio input (e.g., audio input that does not deflect off the display 94 toward the microphone 98 or that has limited detectability due to this arrangement of the microphone 98 and the display 94).

In an embodiment, the interactive device 60, 62 may include a sensor 100 configured to detect another operating parameter. As an example, the sensor 100 may be configured to detect image data (e.g., a physical appearance of the guest 56, 58, a gesture or facial expression made by the guest), biometric data of the guest 56, 58, a location of the interactive device 60, 62 (e.g., within the attraction system 50), a battery life of the interactive device 60, 62, a time of day, another suitable operating parameter, or any combination thereof. The sensor 100 may output data indicative of the detected operating parameter to the processing circuitry 68 and/or the processing circuitry 92 for operating the attraction system 50 accordingly. In the illustrated embodiment, the interactive device 60, 62 also includes a speaker 102, which may be configured to output sounds. For instance, the interactive device 60, 62 may output audio effects based on instructions transmitted by the processing circuitry 68 and/or the processing circuitry 92 to provide a unique experience to the guest 56, 58 in conjunction with the visual image provided by the display 94. The interactive device 60, 62 may additionally or alternatively include any other suitable component, such as a component configured to provide haptic feedback, a light source, an actuatable component, and so forth, which may enhance the experience provided to the guest 56, 58.

Figure 3:
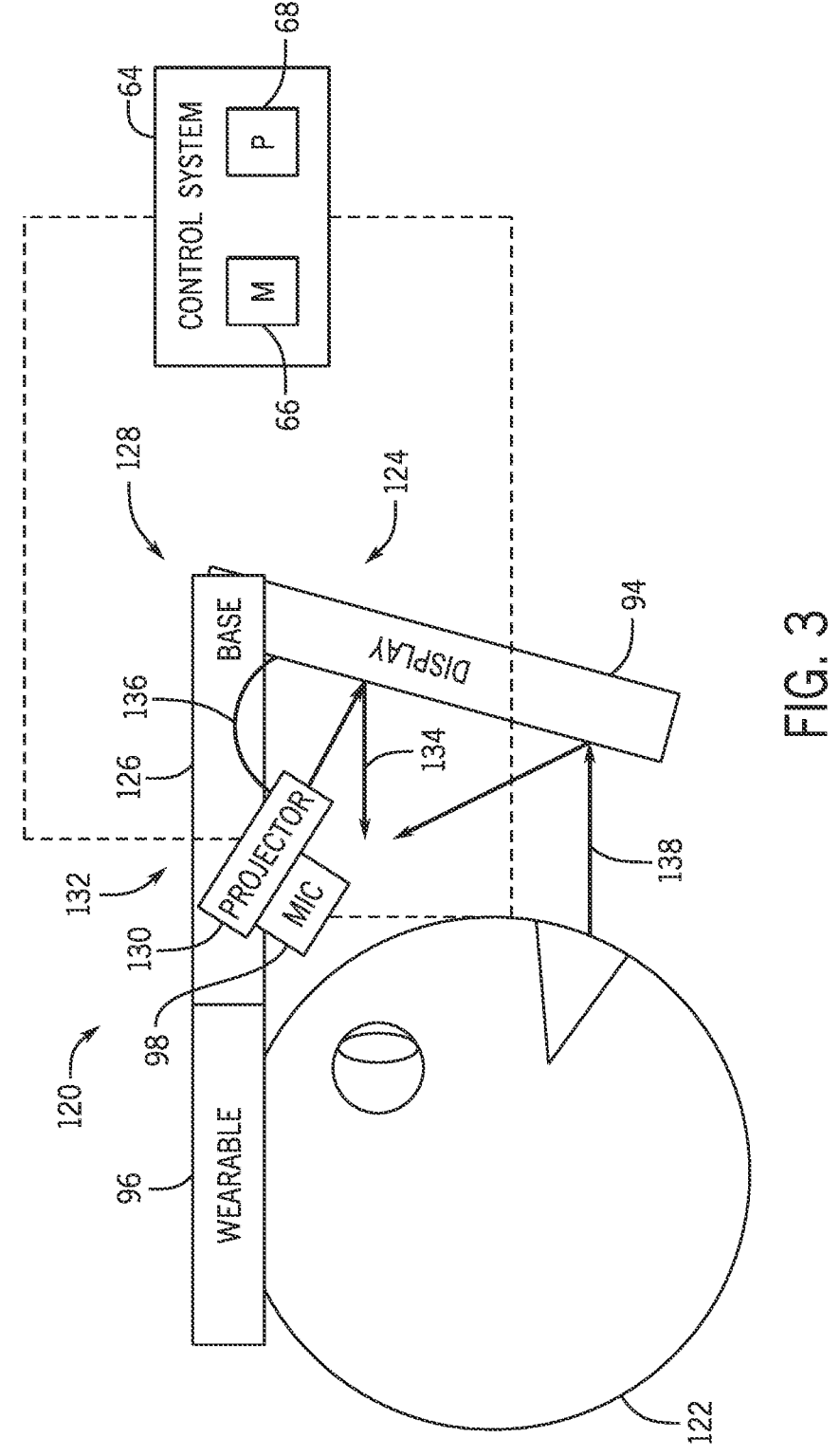
FIG. 3 is a schematic diagram of an embodiment of an interactive device of an attraction system, in accordance with an aspect of the present disclosure.

FIG. 3 is a schematic diagram of an embodiment of an interactive device 120, which may be an embodiment of either of the interactive devices 60, 62. The illustrated interactive device 120 is equipped by a user or guest 122 (e.g., of the attraction system 50). For example, the interactive device 120 may include the wearable component 96, which may be a headset configured to be worn on the head of the user 122. In an additional or alternative embodiment, the wearable component 96 may include another component configured to be equipped by the user 122 in another manner, such as held by the user, worn on a shoulder of the user 122, and the like.

The interactive device 120 may also include an interactive assembly 124 configured to couple to the wearable component 96. As an example, the interactive assembly 124 may include a base 126 configured to attach to the wearable component 96. In an embodiment, the wearable component 96 and the interactive assembly 124 may be separate components (e.g., the interactive device 120 may be modular), and the base 126 may be configured to couple to the wearable component 96 via a fastener, a mechanical fitting (e.g., an interference fit), a strap, a hook, a punch through, and the like. Indeed, the coupling between the interactive assembly 124 and the wearable component 96 may enable the interactive assembly 124 to be easily detached from the wearable component 96, such as for maintenance purposes. In an additional or alternative embodiment, the wearable component 96 and the interactive assembly 124 may be integral with one another. For instance, the base 126 may be attached to the wearable component 96 via welding and/or molding. The interactive assembly 124 may enable the interactive device 120 to provide a unique experience to the user 122, such as based on interactions between the user 122 and the interactive assembly 124.

The interactive assembly 124 may include the display 94 extending from a first end 128 of the base 126, a projector 130 coupled to a medial section or portion 132 of the base 126, and the microphone 98 coupled to the medial section 132 of the base 126. The projector 130 may be configured to project an image onto the display 94 to present the image to the user 122. For example, the projector 130 may be oriented obliquely relative to the display 94 to cause the image projected by the projector 130 to deflect off the display 94 in first directions 134 to the user 122 (e.g., toward the eyes of the user 122). To this end, the display 94 may include a reflective lens that enables the user 122 to view the projected image more clearly. In one embodiment, the interactive assembly 124 may provide a virtual reality, augmented reality, and/or mixed reality experience for the user 122, in which the image projected by the projector 130 may include virtual or computer-generated elements that supplement and/or replace a real-world (e.g., physical) object. Thus, the display 94 may include an opacity selected to enable or block viewing of the real-world environment through the display 94 while the projector 130 projects the image onto the display 94.

The microphone 98 may also be oriented obliquely relative to the display 94 to enable the microphone 98 to receive audio waves deflecting off the display 94. Indeed, each of the projector 130 and the microphone 98 may be oriented at an oblique angle 136 (e.g., substantially the same oblique angle, different oblique angles), such as an acute angle or an obtuse angle. The microphone 98 may be arranged to enable the microphone 98 to receive the audio waves (e.g., speech) output by the user 122 and deflecting off the display 94 in second directions 138 to the microphone 98. Additionally, the position of the microphone 98 relative to the display 94 may enable the display 94 to block the microphone 98 from receiving and processing other audio waves, such as audio waves that are not output by the user 122 (e.g., audio waves output by another user, audio waves output by the show effects 54). Indeed, when the user 122 equips the interactive device 120, the user 122 (e.g., the head of the user 122) and the display 94 may collectively enclose the microphone 98 to block the microphone 98 from receiving unwanted audio waves. In one embodiment, the microphone 98 may include a directional microphone configured to capture and process audio waves at a particular area or approaching from a particular direction with respect to the microphone 98. Indeed, the microphone 98 may not process audio waves emitted in other directions to the microphone 98, such as audio waves that do not deflect off the display 94. As such, the microphone 98 may further enable processing of audio waves output by the user 122 equipping the interactive device 120. The display 94 may have a geometry (e.g., an overall shape or surface) that is curved, beveled, and/or angled to receive audio waves from a mouth of the user 122 and direct the audio waves via deflection toward the microphone 98. The shape of the display 94 may have a complementary operation that deflects external sound (e.g., sound not originating from the user 122) away from the microphone 98. In addition to the protection provided by the display 94, the microphone 98 may be enclosed, partially surrounded, or otherwise protected from receipt of audio from other directions by physical barriers (e.g., raised plastic walls) defined by aspects of the interactive device 120.

The control system 64 may be configured to control operation of the interactive device 120. For example, the control system 64 may be communicatively coupled to the projector 130 and the microphone 98. In an embodiment, the control system 64 may be configured to receive audio data from the microphone 98. The audio data may be based on or include the audio waves received by the microphone. The control system 64 may be configured to control the projector 130 to present images based on the audio data received from the microphone 98. By way of example, the control system 64 may be configured to identify keywords and/or phrases from the audio data via natural language processing and identify corresponding image data (e.g., image data stored in the memory 66) based on the keywords, phrases, and/or other context associated with the audio data via command recognition. The control system 64 may then transmit the image data to the projector 130 to cause the projector 130 to present an image based on the image data. In this manner, the control system 64 may cause the projector 130 to present images based on actions performed by (e.g., words spoken by) the user 122 and provide a more interactive experiences to the user 122.

In an embodiment, the control system 64 may also be configured to operate to filter potentially unwanted audio signals in order to process received audio data more desirably (e.g., for controlling operation of the projector 130). As an example, the control system 64 may be configured to filter out audio waves having a certain characteristic (e.g., a threshold frequency, a threshold amplitude, a threshold wavelength, a threshold time period, a threshold speed). For instance, certain audio effects, such as sounds produced by the show effects 54, may produce audio waves having expected characteristics, and the control system 64 may filter out such audio waves based on the expected characteristics. Thus, the control system 64 may better process received audio data, such as words spoken by the user 122. In an additional or an alternative embodiment, the control system 64 may be configured to determine that audio waves output by multiple users are being received, associate the respective audio waves with different users, and select the audio waves associated with a specific user for operating the interactive device 120. By way of example, the control system 64 may receive first audio waves that have a first characteristic, such as a first intensity (e.g., a first amplitude), and second audio waves that have a second characteristic, such as a second intensity (e.g., a second amplitude). For instance, the first audio waves may be output by the user 122 to which the interactive device 120 is equipped, and the second audio waves may be output by a different user positioned adjacent to the user 122. As such, the control system 64 may operate the interactive device 120 based on the first audio waves instead of the second audio waves. In a further embodiment, the control system 64 may determine that certain audio waves received by the interactive device 120 have already been received for operating another interactive device, such as based on the audio waves received by the interactive device 120 having characteristics that match that of the audio waves received by the other interactive device. The control system 64 may therefore block the interactive device 120 from operating based on the audio waves that have already been processed for operating the other interactive device.

In one embodiment, the interactive device 120 may include multiple microphones 98 arranged at different positions and/or orientations. Thus, each of the microphones 98 may be configured to receive different audio waves. For example, a first subset of microphones 98 may primarily receive audio waves output by the user 122, and a second subset of microphones 98 may primarily receive audio waves generated by a different source, such as by the show effects 54. The control system 64 may collectively process the audio waves received by each of the microphones 98 to determine the manner in which the interactive device 120 is to be controlled. As an example, the control system 64 may determine an interaction between the user 122 and the interactive device 120 based on the audio waves received via the first subset of microphones 98, and the control system 64 may determine a context associated with the interactive device 120 based on the audio waves received via the second subset of microphones 98. The control system 64 may then operate the interactive device 120, such as by transmitting an image data to the projector 130, based on both the interaction and the context. In some embodiments, sounds detected by one microphone (or subset of microphones) may be subtracted from sounds detected by a second microphone (or subset of microphones) to facilitate identification of particular sounds.

The control system 64 may also selectively operate the microphones 98. In an embodiment, the control system 64 may be configured to operate the microphones 98 independently from one another. As such, the control system 64 may selectively enable or suspend operation of each of the microphones 98, such as based on an operating mode (e.g., a type of ride cycle) of the attraction system 50. By way of example, the control system 64 may block receipt of audio waves from a subset of the microphones 98. In an additional or alternative embodiment, the control system 64 may receive the audio waves from each of the microphones 98, determine the respective microphones 98 associated with each of the received audio waves, select a subset of the microphones 98, and operate the interactive device 120 based on the audio waves received from the subset of the microphones 98. For example, the control system 64 may receive or operate based on audio waves captured by the first subset of microphones 98 instead of the audio waves captured by the second set of microphones 98 in order to operate the interactive device 120 primarily based on the audio waves emitted by the user 122.

Figure 4:
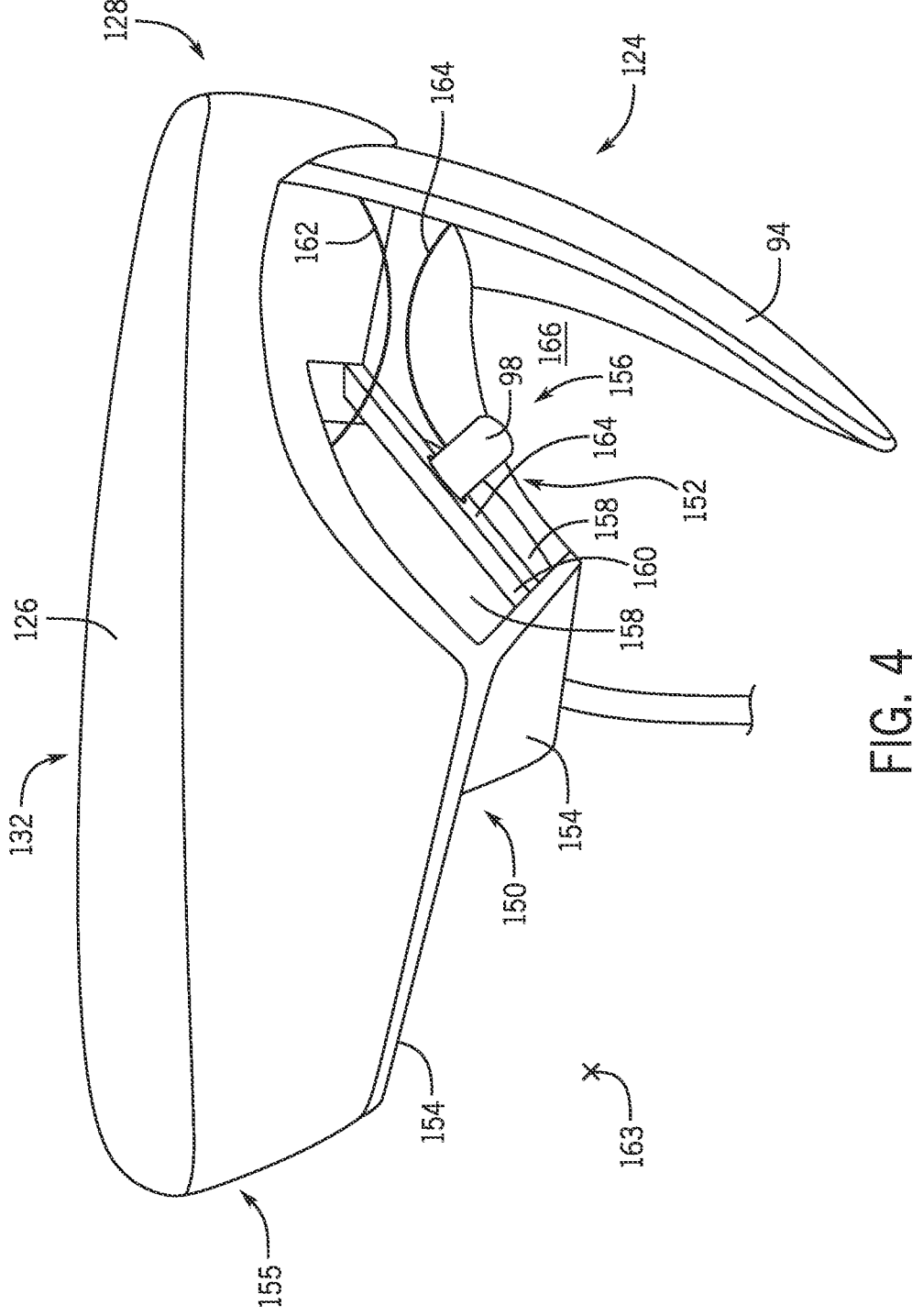
FIG. 4 is a side perspective view of an embodiment of an interactive assembly of an interactive device, in accordance with an aspect of the present disclosure.

FIG. 4 is a perspective side view of an embodiment of the interactive assembly 124. The interactive assembly 124 includes the base 126, which may be shaped to form a housing or enclosure 150. In the illustrated embodiment, the base 126 includes a base section 152 located at the medial section 132 of the base 126, as well as lateral sections 154 extending from the base section 152 (e.g., opposite lateral ends of the base section 152) to form a U-shaped profile defining the housing 150. At least a portion of the projector 130 and/or the microphone 98 may be positioned within housing 150, and the housing 150 may shield the projector 130 and/or the microphone 98. For example, the sections 152, 154 may protect the projector 130 and/or the microphone 98 from contacting external elements, such as dust, debris, and so forth, in order to improve operation of the projector 130 and/or the microphone 98. In an embodiment, the base 126 may include additional sections, and/or the interactive assembly 124 may include additional components (e.g., panels) that may be coupled to the sections 152, 154 to further enclose the projector 130 and/or the microphone 98 within the housing 150.

The lateral sections 154 may be configured to couple to the wearable component 96 in an assembled configuration of the interactive device 120, such as to couple the wearable component 96 to a second end 155, opposite the first end 128, of the base 126. For example, the lateral sections 154 may include connectors (e.g., a hook, a hole, a punch-through, a mount) to which the wearable component 96 (e.g., a corresponding connector of the wearable component 96) may be coupled. Additionally, the base section 152 may include an opening 156 formed through the base section 152 and one or more screens 158 spanning the opening 156. The projector 130 positioned within the housing 150 may be configured to project images through the screen 158 to deflect off the display 94. For instance, the screen 158 may cause the image projected by the projector 130 to appear in a desirable manner on the display 94, such as to direct the image to approach the display 94 at a particular angle to deflect off the display 94 for visualization by the user 122. To this end, the projector 130 and/or the screen 158 may be oriented with respect to the display 94 at a first oblique angle 162. In an embodiment, the display 94 may include a concave profile to facilitate presenting the image to the user

122. For example, the concave profile may enable the image received from the projector 130 to be seen more clearly by the user 122, such as by adjusting the focus of the image with respect to the eyes of the user 122.

Additionally, a segment 160 may extend across the opening 156, thereby dividing the opening 156 into separate spaces. In an embodiment, a separate screen 158 may span across each of the spaces of the openings 156. That is, the screens 158 may be offset from one another along a lateral axis 163 of the interactive device 120. A separate projector 130 may be configured to project images through the respective screens 158 and onto the display 94. As an example, the control system 64 may be configured to control each of the projectors 130 independently from one another to project a different image onto the display 94 and improve control of a visualization presented to the user 122. For instance, one of the projectors 130 may project a first image that may primarily be viewed by one of the eyes of the user 122, and another of the projectors 130 may project a second image that may primarily be viewed by another of the eyes of the user 122. In one embodiment, the user 122 may visually combine the first image and the second image projected by the projectors 130 to perceive a collective image having three-dimensional depth (e.g., via stereoscopy). Thus, the images projected by the projectors 130 may provide a more realistic visualization for the user 122.

The microphone 98 may be configured to couple to the segment 160. For example, an aperture 164 may be formed through the segment 160, and the microphone 98 may be inserted into the aperture 164. Thus, the microphone 98 may be positioned between the screens 158 and/or the projectors 130. The microphone 98 may be oriented with respect to the display 94 at a second oblique angle 165 such that the microphone 98 is focused to receive or capture audio waves deflecting off the display 94. In embodiments in which the display 94 includes a concave profile, the concave profile may facilitate directing audio waves toward the microphone 98. For example, the concave profile may concentrate or collect audio waves deflecting off the display 94 to a focal point on the display 94 and direct such audio waves from the focal point to the microphone 98, thereby enabling audio waves that deflect off any suitable location of the display 94 to be directed toward the microphone 98.

The microphone 98 may extend into a gap 166 spanning between the base section 152 and the display 94. In the illustrated embodiment, the gap 166 may be exposed to an external environment to reduce an amount of material and/or a number of parts of the interactive assembly 124, thereby simplifying manufacture of the interactive device 120. In additional or alternative embodiments, the interactive assembly 124 may more fully enclose the microphone 98. As an example, the display 94 (e.g., lateral edges of the display 94) may extend toward the lateral sections 154 of the base 126, and/or additional components may be used to extend between the lateral sections 154 and the display 94. Thus, the interactive assembly 124 may block the microphone 98 from receiving audio waves directed from the external environment and improve receipt of the audio waves deflecting off the display 94.

Figure 5:
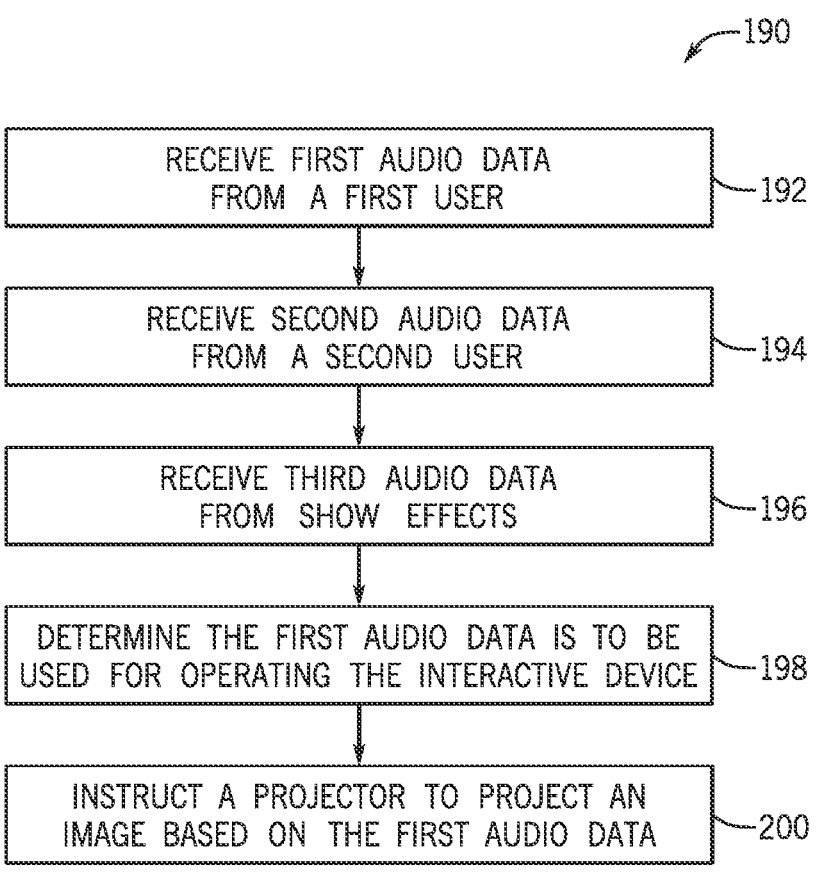
FIG. 5 is a flowchart of an embodiment of a method for operating an interactive device of an attraction system, in accordance with an aspect of the present disclosure.

FIG. 5 is a flowchart of an embodiment of a method or process 190 for operating an interactive device (e.g., any of the interactive devices 60, 62, 120). Any suitable device (e.g., the processing circuitry 68 of the control system 64, the processing circuitry 92 of the interactive devices 60, 62) may perform the method 190. In one embodiment, the method 190 may be implemented by executing instructions stored in a tangible, non-transitory, computer-readable medium (e.g., the memory 66 of the control system 64, the memory 90 of the interactive devices 60, 62). For example, the method 190 may be performed at least in part by one or more software components, one or more software applications, and the like. While the method 190 is described using steps in a specific sequence, additional steps may be performed, the described steps may be performed in different sequences than the sequence illustrated, and/or certain described steps may be skipped or not performed altogether.

At block 192, first audio data may be received. The first audio data may be received from (e.g., output by) a first user. For example, the interactive device may be equipped by the first user, and the first audio data may include or be based on audio waves output by the first user, deflecting off the display of the interactive device, and directed from the display to the microphone of the interactive device. Indeed, the microphone may be oriented to facilitate receipt and capture of the audio waves deflecting off the display. For this reason, the audio waves of the first audio data may include a first (e.g., higher) intensity.

At block 194, second audio data may be received from a second user (e.g., positioned adjacent to the first user). The second audio data may include or be based on audio waves output by the second user. For example, each of the first audio data and the second audio data may include speech. Thus, the second audio data may include certain characteristics (e.g., pitch, tone) similar to the first audio data received from the first user. However, the interactive device may not be equipped by the second user, and the display may therefore block a substantial amount of the audio waves output by the second user from being directed to the microphone. Indeed, the microphone may not capture as many audio waves output by the second user as compared to the audio waves output by the first user. As a result, the audio waves of the second audio data may include a second (e.g., lower) intensity.

At block 196, third audio data may be received from show effects of the attraction system (e.g., the third audio data may include or be based on audio waves produced by the show effect). For example, the show effects may include various audio effects, such as weather elements, animal sounds, mechanical noises, and the like. Such audio effects may be different from speech or spoken words. Thus, the characteristics associated with the third audio data may be substantially different from the characteristics associated with the first audio data and the second audio data. Additionally, the display may also block a substantial amount of the audio waves output by the show effects from being directed to the microphone.

At block 198, a determination may be made that the first audio data is to be used for operating the interactive device. Indeed, the first audio data, the second audio data, and the third audio data may be discernable from one another (e.g., based on the respective characteristics associated with the audio data). By way of example, the characteristics associated with the first audio data, the second audio data, and the third audio data may be analyzed and compared with one another. For instance, the interactive device may be operated based on audio data indicative of audio waves output by the user to which the interactive device is equipped. As such, based on a determination that the third audio data does not include characteristics indicative of audio waves output by a user, a determination may be made that the third audio data is not to be used to operate the interactive device. In an example, the characteristics associated with the third audio data may not match with expected characteristics indicative of audio waves output by a user. In another example, the characteristics associated with the third audio data may indicate that the third audio data includes or is based on audio waves output by the show effects of the attraction system. For instance, audio waves output by the show effects may have other expected characteristics, the determined characteristics associated with the third audio data may match with the other expected characteristics, and the third audio data may be identified as including or being based on audio waves output by the show effects and not a user in response.

Furthermore, as described above, the second audio data may include certain characteristics that may be similar to that of the first audio data. However, the second audio data may have a substantially lower intensity than that of the first audio data. Thus, a determination may be made that the second audio data is not to be used to operate the interactive device based on the intensity associated with the second audio data being below a threshold intensity. Additionally or alternatively, a determination may be made that the second audio data is being used to operate a different interactive device. For instance, the characteristics associated with the second audio data may match with characteristics associated with fourth audio data received by another interactive device, such as fourth audio data being used to operate the other interactive device. As a result, a determination may be made that the second audio data is not to be used to operate the interactive device.

At block 200, the projector may be instructed to project an image based on the first audio data. As an example, based on identified keywords and/or phrases included in the first audio data, corresponding image data may be identified and transmitted to the projector. The projector may then present an image based on the image data. In this manner, the interactive device may operate based on audio waves output by the user equipping the interactive device, such as by adjusting a visualization provided to the user. As such, the interactive device may be operated to provide a more interactive and personal experience to the user and undesirable operation of the interactive device may be blocked, such as based on interference from audio waves output by a different user and/or by the show effects.

While only certain features of the disclosed embodiments have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A wearable device for an attraction system, the wearable device comprising:
   a display;
   a projector oriented at an oblique angle with respect to the display, wherein the projector is configured to project an image onto the display; and a microphone configured to receive sound from a user of the wearable device, wherein the microphone is disposed between the display and a rear end of the wearable device, and the display is configured to deflect the sound from the user toward the microphone.

2. The wearable device of claim 1, wherein the display comprises a concave profile configured to direct the sound toward a focal point.

3. The wearable device of claim 1, comprising processing circuitry configured to:

receive audio data from the microphone; and instruct the projector to project an image based on the audio data.

4. The wearable device of claim 3, wherein:

the audio data comprises first audio data and second audio data; and the processing circuitry is configured to discern the first audio data from the second audio data and instruct the projector to project the image based on the first audio data.

5. The wearable device of claim 4, wherein the first audio data is associated with the sound from the user and the second audio data is associated with additional sound from an additional user.

6. The wearable device of claim 5, wherein:

the audio data comprises third audio data associated with show effects of the attraction system; and the processing circuitry is configured to discern the first audio data from the third audio data.

7. The wearable device of claim 1, comprising a speaker configured to output an audio effect based on the sound received by the microphone.

8. The wearable device of claim 1, comprising a screen disposed between the projector and the display, wherein the projector is configured to project the image through the screen and onto the display.

9. The wearable device of claim 8, wherein:

the screen is a first screen;

the wearable device comprises a second screen disposed between the projector and the display;

the first screen and the second screen are offset from one another along a lateral axis of the wearable device; and the microphone is positioned between the first screen and the second screen.

10. The wearable device of claim 1, comprising:

a wearable component configured to attach the wearable device to the user; and an interactive assembly comprising a base configured to couple to the wearable component, wherein the display extends from the base, and the microphone is coupled to the base.

11. A wearable device for an attraction system, the wearable device comprising:

a display;

a projector configured to project an image onto the display, wherein the projector is pointed at an oblique angle with respect to the display; and a microphone configured to receive sound originating from a user of the wearable device and deflected from the display, wherein the display is configured to block noise of an external environment from the microphone.

12. The wearable device of claim 11, wherein the display comprises a curved surface configured to focus the sound toward the microphone.

13. The wearable device of claim 11, comprising processing circuitry configured to discern the sound from the noise.

14. The wearable device of claim 11, wherein:

the projector is a first projector;

the image is a first image;

the wearable device comprises a second projector configured to project a second image onto the display; and the first image and the second image are configured to produce a stereoscopic effect.

15. The wearable device of claim 11, wherein the microphone is a directional microphone oriented toward the display.

16. A system, comprising:

a wearable device comprising a display and a microphone, wherein the microphone is configured to receive sound comprising a voice input from a user, the microphone is disposed between the display and a rear end of the wearable device, and the display is configured to deflect the sound toward the microphone;

one or more show effects configured to produce a visual effect, a sound effect, or both, external to the wearable device; and a control system configured to control operation of the wearable device and the one or more show effects based on the voice input.

17. The system of claim 16, comprising an additional wearable device comprising an additional microphone configured to receive additional sound comprising an additional voice input from an additional user, wherein the control system is configured to filter the additional voice input from the sound received by the microphone of the wearable device.

18. The system of claim 16, wherein the one or more show effects are configured to produce the sound effect, and the control system is configured to filter the sound effect from the sound received by the microphone.

19. The system of claim 16, wherein the display is configured to block noise of an external environment from the microphone.

20. The system of claim 16, wherein the display comprises a concave profile configured to direct the sound toward a focal point.

* * * * *